United States Patent
Hamada et al.

[11] Patent Number: 5,188,346
[45] Date of Patent: Feb. 23, 1993

[54] FLUID-FILLED ELASTIC MOUNT HAVING TWO PRESSURE-RECEIVING CHAMBERS COMMUNICATING WITH EQUILIBRIUM CHAMBER THROUGH RESPECTIVE ORIFICE PASSAGES

[75] Inventors: Masaaki Hamada, Komaki; Takashi Yoshida, Kasugai, both of Japan

[73] Assignee: Tokai Rubber Industries, Ltd., Japan

[21] Appl. No.: 592,305

[22] Filed: Oct. 2, 1990

[30] Foreign Application Priority Data

Oct. 2, 1989 [JP] Japan .................. 1-257487

[51] Int. Cl.$^5$ .................. F16F 13/00; F16M 1/02
[52] U.S. Cl. .................. 267/140.12; 180/312; 248/562; 248/636; 267/219
[58] Field of Search .......... 267/219, 140.11, 140.12; 248/562, 636; 180/300, 312, 902

[56] References Cited

U.S. PATENT DOCUMENTS

| | | | |
|---|---|---|---|
| 4,749,173 | 6/1988 | Kanda | 180/312 X |
| 4,861,005 | 8/1989 | Bausch | 267/140.1 C |
| 4,884,789 | 12/1989 | Takeda et al. | 267/219 X |
| 4,895,353 | 1/1990 | Roth et al. | 267/35 X |
| 4,909,489 | 3/1990 | Doi | 267/140.1 |
| 4,971,300 | 11/1990 | Ticks | 267/140.1 |
| 4,971,456 | 11/1990 | Hori | 267/140.1 C X |

FOREIGN PATENT DOCUMENTS

| | | | |
|---|---|---|---|
| 298862 | 1/1989 | European Pat. Off. | 267/219 |
| 56-164242 | 12/1981 | Japan . | |
| 126451 | 5/1989 | Japan | 267/140.1 |
| 26337 | 1/1990 | Japan | 267/140.1 |

*Primary Examiner*—George A. Halvosa
*Attorney, Agent, or Firm*—Parkhurst, Wendel & Rossi

[57] ABSTRACT

A fluid-filled elastic mount including an elastic body which is interposed between radially spaced-apart inner and outer sleeves and which at least partially defines a first pressure-receiving chamber containing a non-compressible fluid. A partition is provided for partially defining at least one second pressure-receiving chamber filled with the fluid. The partition includes a displaceable flexible layer which permits a pressure change in the first pressure-receiving chamber to be transmitted to the second pressure-receiving chamber or chambers. A variable-volume equilibrium chamber filled with the fluid is partially defined by a flexible diaphragm, and communicates with the first pressure-receiving chamber through a first orifice passage, and with each second pressure-receiving chamber through a second orifice passage whose ratio of a transverse cross sectional area to a length is larger than that of the first orifice passage.

10 Claims, 7 Drawing Sheets

FLUID-FILLED ELASTIC MOUNT HAVING TWO PRESSURE-RECEIVING CHAMBERS COMMUNICATING WITH EQUILIBRIUM CHAMBER THROUGH RESPECTIVE ORIFICE PASSAGES

BACKGROUND OF THE INVENTION

1. Field of the Invention

The present invention relates in general to a fluid-filled cylindrical elastic mount for damping or isolating vibrations based on resonance of a fluid contained therein. More particularly, this invention is concerned with such a fluid-filled cylindrical elastic mount capable of exhibiting excellent vibration damping or isolating effect based on the resonance of the fluid flows, over a wide range of frequency of the input vibration.

2. Discussion of the Prior Art

There has been a growing requirement for improving the operating characteristic and function of a vibration damping or isolating device for flexibly connecting two members. In view of the difficulty in satisfying the requirement on a conventional elastic vibration damper or isolator which relies solely on the elastic nature of an elastic body to provide a vibration damping or isolating effect, an elastic mount or bushing filled with a fluid has been recently proposed.

An example of such a fluid-filled elastic mount is disclosed in laid-open Publication No. 56-164242 of unexamined Japanese patent application, wherein an elastic body made of a rubbery material is formed between an inner and an outer sleeve which are radially spaced apart from each other. The elastic body flexibly connects the inner and outer sleeves, so that two members of a vibration system that are fixed to the inner and outer sleeves are connected to each other by the elastic mount in a vibration damping or isolating manner. Between the inner and outer sleeves, there are formed a plurality of fluid chambers filled with a suitable non-compressible fluid. The fluid chambers are held in communication with each other through an orifice passage. Upon application of a vibrational load in a diametrical direction of the elastic mount, the fluid is forced to flow between the fluid chambers through the orifice passage. This type of fluid-filled cylindrical elastic mount relies on the resonance of the fluid flowing through the orifice passage, and exhibits an excellent vibration damping or isolating effect that cannot be obtained with the conventional elastic mount or damper which uses only an elastic body.

The fluid-filled cylindrical elastic mount of the type described above is capable of effectively damping or isolating input vibrations received in various diametrical directions, and can be readily adapted to prevent an excessive amount of relative displacement of the two members flexibly connected by the elastic mount. Further, this elastic mount can be made compact and small in size. For these advantages, the fluid-filled cylindrical elastic mount is suitably used as an engine mount, a differential mount, a member mount and a suspension bushing for motor vehicles. These elastic mounts used for the vehicles are usually subject to various vibrations having different frequencies, which occur depending upon the varying running conditions of the vehicles. Accordingly, the elastic mounts are required to exhibit different operating characteristics for effectively damping or isolating such different bands of the input vibrations, i.e., to deal with a relatively wide range of the input vibrations.

For instance, an engine mount for a motor vehicle is required to exhibit a low dynamic spring constant with respect to medium-frequency vibrations such as engine idling vibration having a frequency range of about 20-50 Hz, while the vehicle is stopped with the engine running in an idling condition. While the vehicle is cruising, the engine mount is also required to exhibit a high damping effect with respect to low-frequency vibrations such as engine shake and bounce having frequencies in the neighborhood of 10 Hz, and also exhibit a low dynamic spring constant with respect to high-frequency vibrations such as booming noises having frequencies in the neighborhood of 100 Hz.

However, the conventional fluid-filled cylindrical engine mount exhibits a sufficient damping or isolating effect based on the resonance of the fluid, with respect to only the vibrations whose frequencies fall within a relatively narrow range including the specific resonance frequency obtained by tuning the orifice passage. Hence, the known fluid-filled cylindrical engine mount is not satisfactory in terms of the above-indicated different requirements. If the resonance frequency of the orifice passage is tuned to provide a high damping effect with respect to the engine shake and bounce or other low-frequency vibrations having frequencies in the neighborhood of 10 Hz, the orifice passage operates as if it was substantially closed when the engine mount receives medium- to high-frequency vibrations whose frequencies are considerably higher than 10 Hz. In this case, therefore, the engine idling vibrations and booming noises cannot be effectively damped or isolated. If the resonance frequency of the orifice passage is tuned to exhibit a sufficiently low dynamic spring constant with respect to the idling vibrations or other medium-frequency vibrations of 20-50 Hz, then the engine mount is not sufficiently capable of damping the low-frequency vibrations such as the engine shake and bounce, and the dynamic spring constant exhibited by the engine mount is not sufficiently low with respect to the high-frequency vibrations such as the booming noises.

SUMMARY OF THE INVENTION

It is therefore an object of the present invention to provide a fluid-filled elastic mount which is capable of satisfying the conventionally incompatible requirements, that is, which exhibits excellent damping or isolating characteristics based on the resonance of the fluid, for a wide range of frequency of the input vibrations.

The above object may be achieved according to the principle of the present invention, which provides a fluid-filled elastic mount for flexibly connecting two members, comprising: (a) an inner and an outer sleeve which are radially spaced apart from each other and which are fixed to the two members; (b) an elastic body interposed between the inner and outer sleeves, for elastically connecting the inner and outer sleeves, the elastic body at least partially defining a first pressure-receiving chamber which is filled with a non-compressible fluid and which is disposed between the inner and outer sleeves such that a pressure in the fluid in said first pressure-receiving chamber changes due to elastic deformation of the elastic body upon application of a vibrational load between the inner and outer sleeves; (c) partition means for partially defining at least one second pressure-receiving chamber between the inner and outer sleeves and separating the first and second pressure-receiving chambers from each other, each of the at least one second pressure-receiving chamber being filled with the fluid, the partition means including a flexible layer which is displaceable to thereby permit a pressure change in the first pressure-receiving chamber to be transmitted to the at least one second pressure-receiving chamber; (d) a flexible diaphragm partially defining a variable-volume equilibrium chamber between the inner and outer sleeves, the equilibrium chamber being spaced apart from the first and second pressure-receiving chambers in a circumferential direction of the inner and outer sleeves and filled with the non-compressible fluid; (e) means for defining a first orifice passage for fluid communication between the first pressure-receiving chamber and the equilibrium chamber; and (f) means for defining a second orifice passage for fluid communication between the each second pressure-receiving chamber and the equilibrium chamber The first and second orifice passages are tuned such that a ratio of a transverse cross sectional area to a length of each second orifice passage is determined to be larger than that of the first orifice passage.

In the fluid-filled elastic mount of the present invention constructed as described above, the first orifice passage is tuned differently from each second orifice passage, so that the differently tuned first and second orifice passages are selectively brought into their operative state, to permit the elastic mount to exhibit different vibration damping or isolating characteristics, depending upon the frequency of the input vibration. That is, the present elastic mount is capable of exhibiting excellent operating characteristics based on the resonance of the fluid flowing through the specifically tuned first and second orifice passages, so as to deal with the input vibrations over a wide frequency range.

The partition means may further and preferably include at least one second flexible layer, in addition to the flexible layer disposed as a first flexible layer adjacent to the first pressure-receiving chamber. The at least one second flexible layer at least partially defines a plurality of second pressure-receiving chambers which are spaced from each other in a radial direction of the inner and outer sleeves. The at least one second flexible layer is displaceable to permit the pressure change in the first pressure-receiving chamber to be successively transmitted to the plurality of second pressure-receiving chambers, which communicate with the equilibrium chamber through a plurality of second orifice passages, respectively. The ratios of the transverse cross sectional area to the length of the second orifice passage chambers are determined to increase with a radial distance of the second pressure-receiving chambers from the first pressure-receiving chamber.

In the above preferred form of the invention, the plurality of second orifice passages for fluid communication of the respective two or more second pressure-receiving chambers with the equilibrium chamber are differently tuned as described above, whereby the elastic mount is capable of exhibiting three or more different operating characteristics based on the resonance of the fluid flowing through the three or more orifice passages, so as to effectively damp or isolate three or more different bands of the input vibrations.

BRIEF DESCRIPTION OF THE DRAWINGS

The above and other objects, features and advantages of the present invention will be better understood by reading the following detailed description of some presently preferred embodiments of the invention, when considered in connection with the accompanying drawings, in which.

DETAILED DESCRIPTION OF THE PREFERRED EMBODIMENTS

Figure 1:
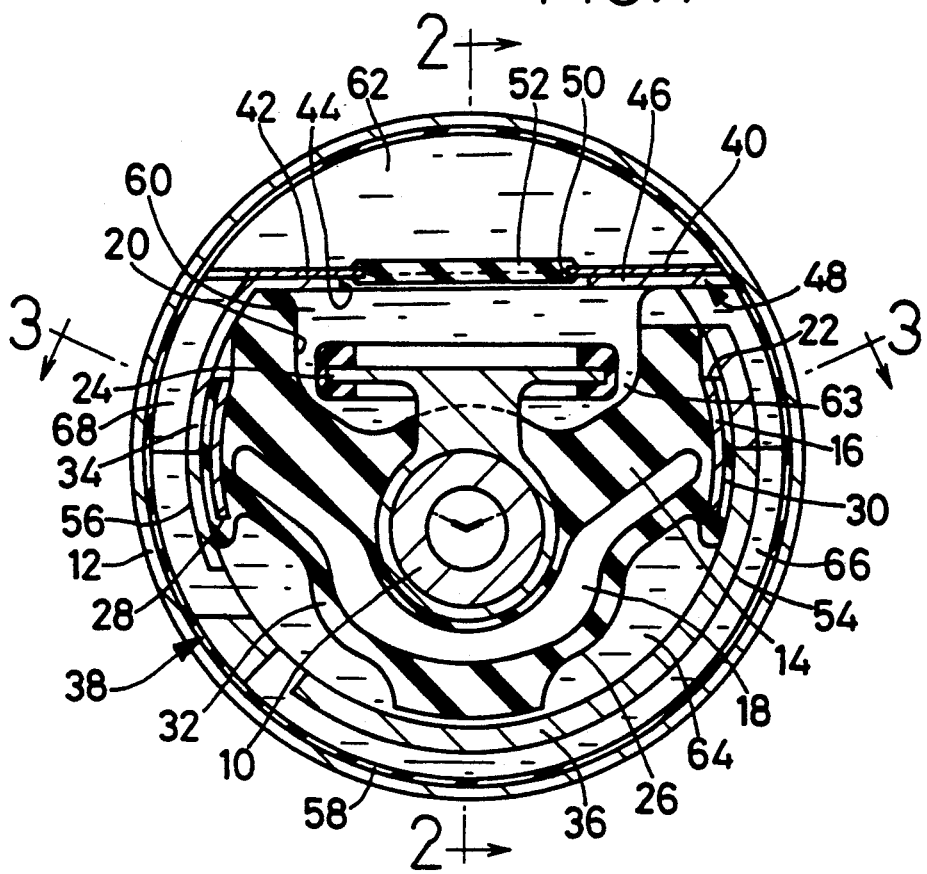
FIG. 1 is an elevational view in transverse cross section of one embodiment of a fluid-filled elastic member of the present invention in the form of a vehicle engine mount.
Figure 2:
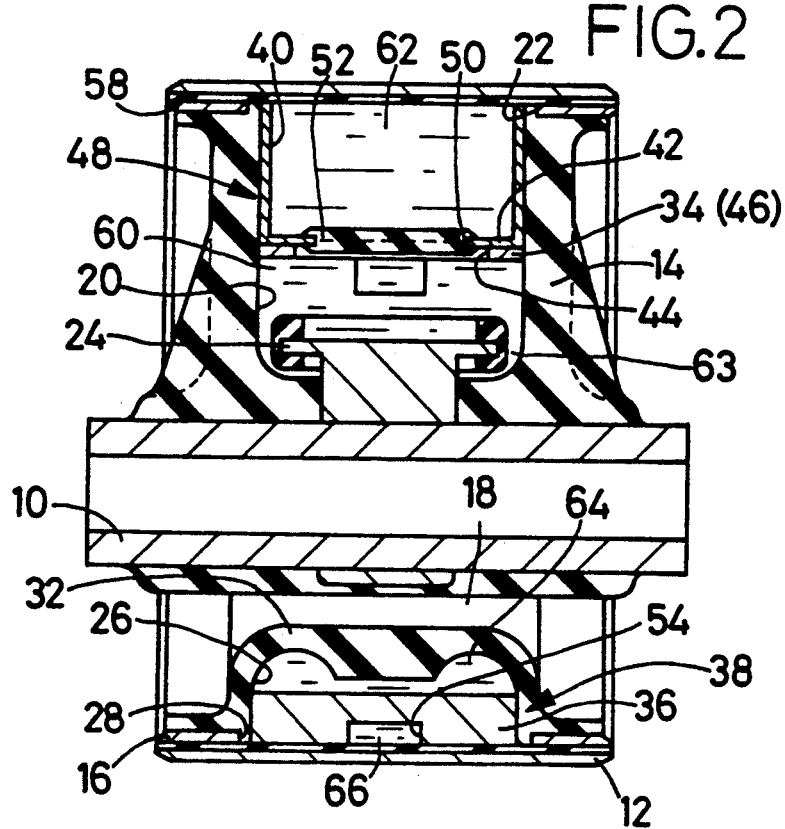
FIG. 2 is a cross sectional view taken along line 2—2 of FIG. 1.
Figure 3:
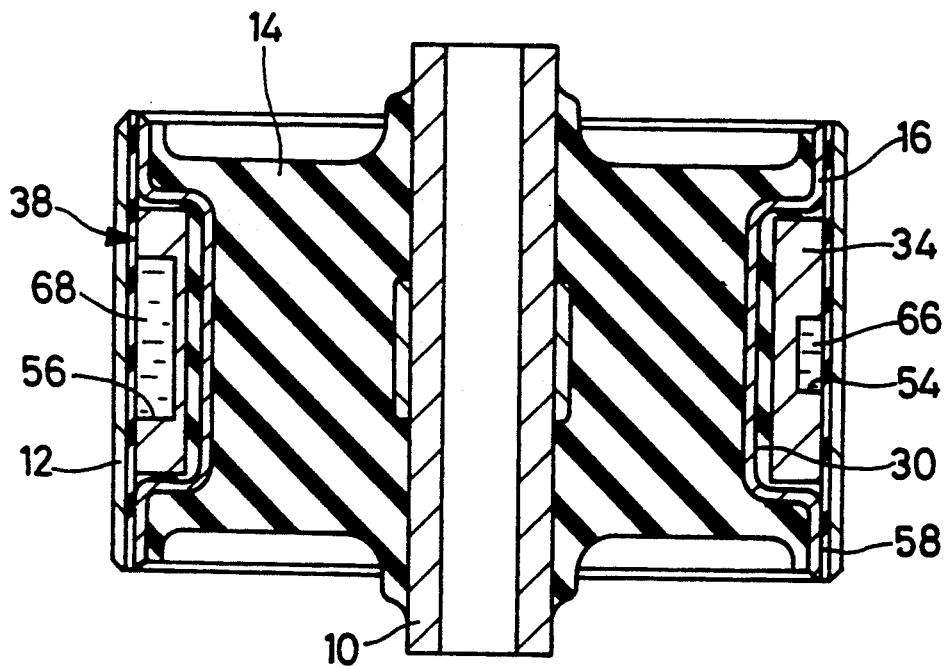
FIG. 3 is a cross sectional view taken along line 3—3 of FIG. 1.

Referring first to FIGS. 1 through 3, there is shown one embodiment of the present invention in the form of an engine mount of an F-F (front-engine, front-drive) motor vehicle. In these figures, reference numerals 10 and 12 denote an inner and an outer sleeve 10, 12, respectively. These inner and outer sleeves 10, 12 are disposed such that the two sleeves are eccentric with each other with a suitable radial offset distance. The inner and outer sleeves 10, 12 are elastically connected to each other by an elastic body 14 formed therebetween. The elastic body 14 has a generally annular cross sectional shape and a relatively large wall thickness.

The engine mount is installed on the vehicle such that the outer sleeve 12 is fixed to an engine unit of the vehicle, while the inner sleeve 10 is fixed to the body of the vehicle. Thus, the power unit is flexibly connected to and supported by the vehicle body, in a vibrational damping or isolating manner. With the engine mount installed on the vehicle, the weight of the power unit acts on the outer sleeve 12 in the direction in which the two sleeves 10, 12 are radially offset from each other, so that the two sleeves 10, 12 are concentric or coaxial with each other. In this condition, the engine mount primarily functions to damp or isolate vibrations received in the direction of offset of the two sleeves 10, 12, i.e., in the vertical direction (as seen in FIG. 1). This direction will be referred to as "load-receiving direction" where appropriate.

Figure 4:
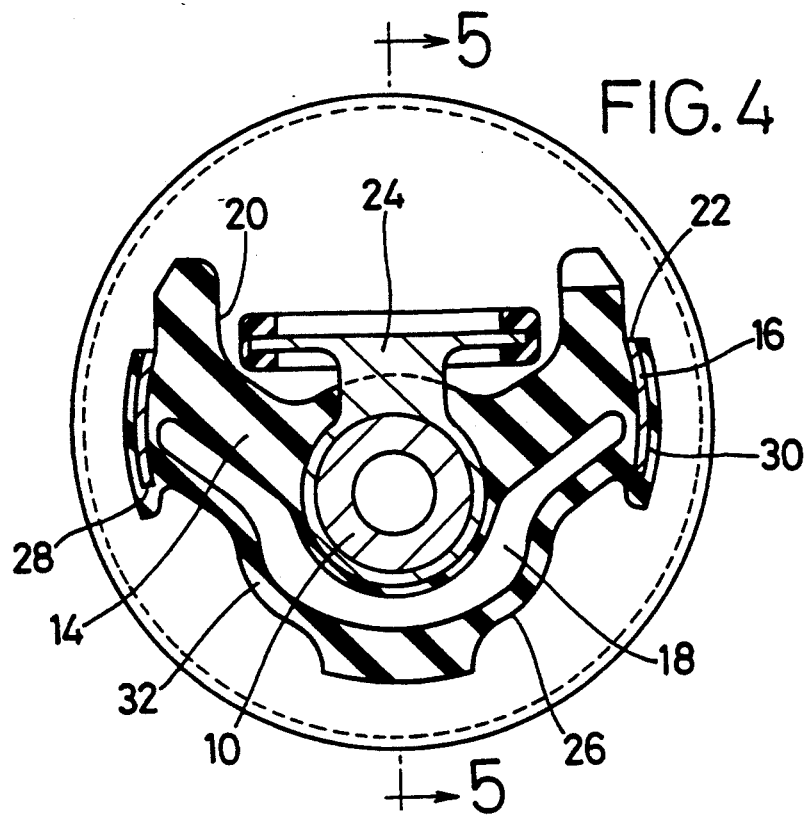
FIG. 4 is an elevational view in transverse cross section of an inner unit of the engine mount of FIG. 1, which is prepared by vulcanization of an elastic body between an inner and an intermediate sleeve.
Figure 5:
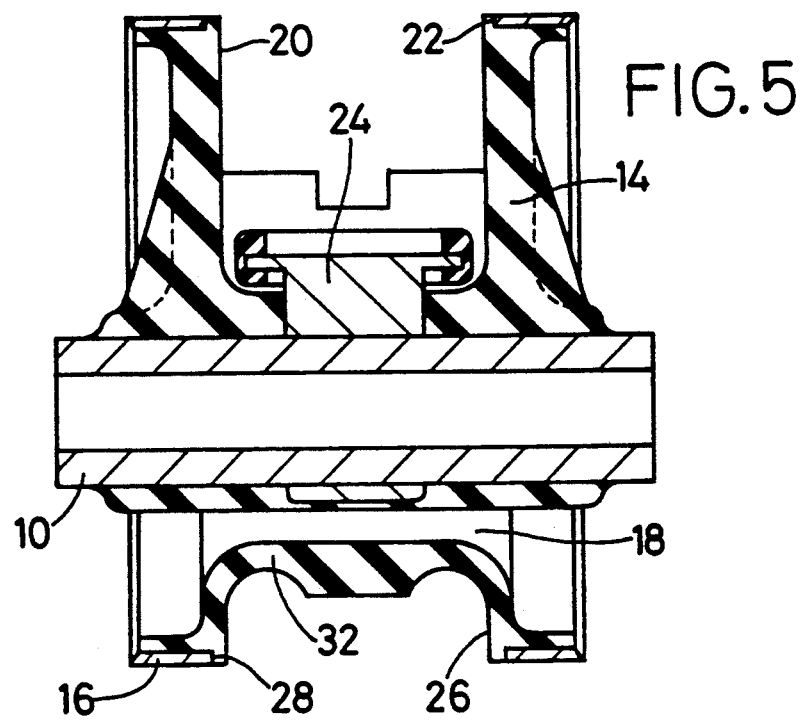
FIG. 5 is a cross sectional view taken along line 5—5 of FIG. 4.

Described more specifically, the inner sleeve 10 has a relatively large radial wall thickness. Radially outwardly of this inner sleeve 10, there is disposed a metallic intermediate sleeve 16 having a relatively small wall thickness such that the sleeve 16 is eccentric with respect to the inner sleeve 10, with a suitable radial offset distance. The elastic body 14 is formed by vulcanization such that the elastic body is bonded to the outer surface of the inner sleeve and the inner surface of the intermediate sleeve 16. Thus, an inner unit of the engine mount as shown in FIGS. 4 and 5 is prepared.

The elastic body 14 has an axial void 18 formed in the axial direction through a circumferential portion thereof at which the radial offset distance between the inner and intermediate sleeves 10, 16 is relatively small. The axial void 18 has a cross sectional shape as shown in FIG. 4, so as to cover substantially a half of the circumference of the intermediate sleeve 16. The axial void 18 functions to reduce a tensile strain of the elastic body 14 due to elastic deformation caused by the weight of the power unit acting on the outer sleeve 12 of the engine mount when installed in position on the vehicle.

The elastic body 14 has a first pocket 20 formed in a circumferential part of an axially intermediate portion thereof, at which the radial offset distance between the inner and intermediate sleeves 10, 16 is relatively large. That is, the first pocket 20 is located on one of diametrically opposite sides of the inner sleeve 10, which is remote from the axial void 18. The first pocket 20 is open in the outer surface of the intermediate sleeve 16, through a window 22 formed through the sleeve 16 in alignment with the pocket 20.

A resonance member 24 having a resonance portion is fixed to an axially intermediate portion of the inner sleeve 10, so that the resonance portion is located within the first pocket 20 of the elastic body 14, so as to substantially divide the depth of the first pocket 20 into upper and lower halves. The resonance portion takes the form of a rectangular plate extending in a plane which is parallel to the axial direction of the inner sleeve 10 and substantially perpendicular to the direction of depth of the pocket 20.

The elastic body 14 further has a second pocket 26 formed in a circumferential part of the axially intermediate portion thereof, at which the radial offset distance between the inner and intermediate sleeves 10, 16 is relatively small, and which is radially outward of the axial void 18. That is, the second pocket 26 is formed on the side of the inner sleeve 10 which is diametrically opposite to the first pocket 20. In other words, the first and second pockets 20, 26 are formed in the diametrically opposite circumferential portions of the elastic body 14, as viewed in the load-receiving direction. The second pocket 26 is open in the outer surface of the intermediate sleeve 16, through a window 28 formed through the sleeve 16 in alignment with the pocket 26. The axial void 18 and the second pocket 26 cooperate with each other to define a relatively thin wall which serves as a flexible diaphragm 32 which is easily elastically deformable. The flexible diaphragm 32 defines the thickness of the axial void 18 (as viewed in FIGS. 1 and 4), and the bottom of the second pocket 26.

The intermediate sleeve 16 has a circumferential groove 30 formed in an axially intermediate portion thereof. As most clearly shown in FIG. 3, the circumferential groove 30 is open radially outwardly of the sleeve 16 and has a bottom whose diameter is smaller than the other portion of the sleeve 16 by a suitable amount. This circumferential groove 30 connects the windows 22, 28 through which the first and second pockets 20, 26 of the elastic body 14 are open in the outer circumferential surface of the sleeve 16.

Figure 6:
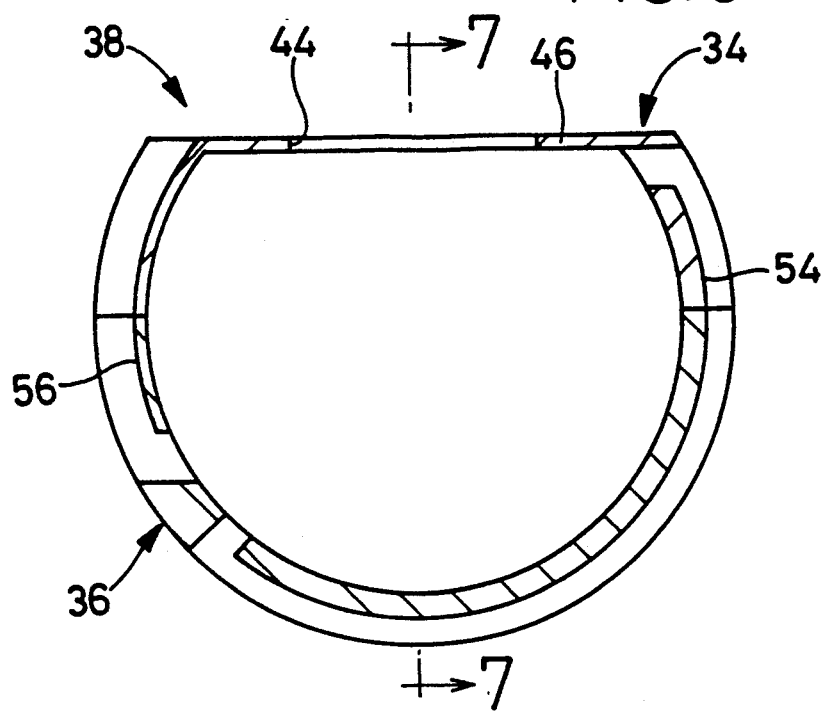
FIG. 6 is an elevational view in transverse cross section of an orifice-defining sleeve incorporated in the engine mount of FIG. 1.
Figure 7:
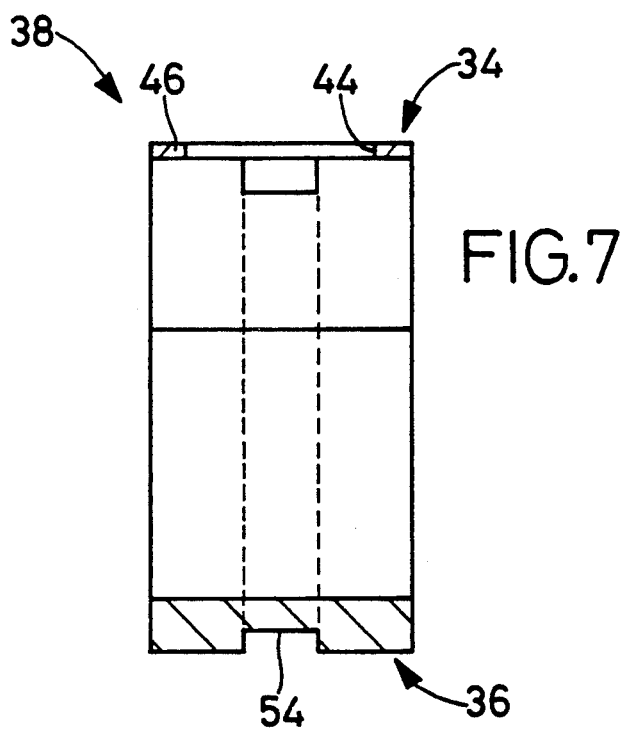
FIG. 7 is a cross sectional view taken along line 7—7 of FIG. 6.

The inner unit of FIGS. 4 and 5 constructed as described above is subjected to a drawing operation on the intermediate sleeve 16 so as to radially inwardly precompress the elastic body 14, before the outer sleeve 12 is mounted on the inner unit. Further, a generally cylindrical orifice-defining sleeve 38 as shown in FIGS. 6 and 7 is received in the circumferential groove 30 of the intermediate sleeve 16. The orifice-defining sleeve 38 consists of a generally semi-cylindrical first orifice-defining member 34 and a semi-cylindrical second orifice-defining member 36. The first orifice-defining member 34 is positioned on the side of the window 22 and first pocket 20, while the second orifice-defining member 36 is positioned on the side of the window 28 and the second pocket 26.

The orifice-defining sleeve 38 has a flat wall 46 on the first orifice-defining member 34, as also shown in FIGS. 6 and 7. The flat wall 46 is positioned within the first pocket 20, as most clearly shown in FIG. 2, when the orifice-defining sleeve 38 is fitted in the circumferential groove 30. As a result, the first pocket 20 is divided by the flat wall 46 into a radially inner and a radially outer portion. The flat wall 46 has an aperture 44 in a central portion thereof.

A channel member 48 having a U-shaped opening 40 (as seen in FIG. 2) and a bottom wall 42 rests on the radially outer surface of the flat wall 46 of the orifice-defining sleeve 38, such that the bottom wall 42 are laid on the flat wall 46. The bottom wall 42 has a window 50 aligned with the aperture 44 of the flat wall 46. The window 50 and the aperture 44 are filled with and thereby closed by a flexible layer 52 formed by vulcanization. The flexible alayer 52 is reinforced by a suitable material such as a canvas.

The orifice-defining sleeve 38 has a first arcuate U-groove 54 and a second arcuate U-groove 56 formed in the outer circumferential surface thereof. As shown in FIG. 6, the first U-groove 54 communicates at its opposite ends with the inside of the orifice-defining sleeve 38, while the second U-groove 56 communicates at one of its opposite ends with the inside of the sleeve 38, and at the other end with the outside of the sleeve 38. With the sleeve 38 received in the circumferential groove 30, the first U-groove 54 communicates with the radially inner portion of the first pocket 20 and the second pocket 26, while the second U-groove 56 communicates with the radially outer portion of the first pocket 20 and the second pocket 26. As described below in detail, the first U-groove 54 has a relatively small width and a relatively large length, while the second U-groove 56 has a relatively large width and a relatively small length.

After the orifice-defining sleeve 38 constructed as described above is fitted on the inner unit of FIGS. 4 and 5, the outer sleeve 12 is mounted on the inner unit, in contact with the intermediate and orifice-defining sleeve 16, 38. The outer sleeve 12 is subjected to a drawing operation to radially inwardly compress the intermediate sleeve 16, whereby the outer sleeve 12 is fixedly mounted on the inner unit with the orifice-defining sleeve 38. The sealing rubber layer 58 formed on the inner circumferential surface of the outer sleeve 12 provides fluid tightness between the outer and intermediate sleeves 12, 16.

With the outer sleeve 12 fluid-tightly fitted on the inner unit, the first pocket 20 and the second pocket 26 are both closed by the outer sleeve 12. The closed pockets 20, 26 are filled with a suitable non-compressible fluid, preferably a fluid having a high degree of fluidity or a relatively low viscosity value, such as water, alkylene glycol, polyalkylene glycol, silicone oil, or a mixture thereof. For example, the filling of the pockets 20, 26 may be accomplished by mounting the outer sleeve 12 on the inner unit, within a mass of the selected non-compressible fluid contained in a suitable vessel.

With the flat wall 46 of the orifice-defining sleeve 38 extending through the closed first pocket 20, a first pressure-receiving chamber 60 is formed radially inwardly of the flat wall 46. Upon application of a vibrational load between the inner and outer sleeves 10, 12, the pressure of the fluid within the first pressure-receiving chamber 60 changes due to elastic deformation of the elastic body 14 caused by the vibrational load. The first pressure-receiving chamber 60 is substantially divided by the resonance portion of the resonance member 24. Namely, a small clearance is provided between the outer periphery of the resonance portion of the resonance member 24 and the inner surface of the pressure-receiving chamber 60. This small clearance around the periphery of the resonance portion serves as a restricted portion 63 of the pressure-receiving chamber 60. This restricted portion 63 permits restricted flows of the fluid therethrough upon application of the vibrational load.

Further, a second pressure-receiving chamber 62 is formed radially outwardly of the flat wall 46 of the orifice-defining sleeve 38. This second pressure-receiving chamber 62 is partially defined by the opening 40 of the U-shaped channel member 48. When, the pressure in the first pressure-receiving chamber 60 changes upon application of a vibrational load to the engine mount, the pressure of the fluid within the second pressure-receiving chamber 60 changes due to elastic deformation or displacement of the flexible layer 52 which partially defines the two pressure-receiving chambers 60, 62.

With the second pocket 26 closed by the outer sleeve 12, there is formed a variable-volume equilibrium chamber 64. The flexible diaphragm 32 absorbs or accommodates a change in the pressure of the fluid in the equilibrium chamber 64. Namely, elastic deformation or displacement of the flexible diaphragm 32 upon application of the vibrational load permits changes in the volume of the equilibrium chamber 64, thereby absorbing the pressure change in the equilibrium chamber 64.

The outer sleeve 12 also closes the first and second arcuate U-grooves 54, 56, thereby providing a first orifice passage 66 corresponding to the U-groove 54, and a second orifice passage 68 corresponding to the U-groove 56. More particularly, the first orifice passage 66 effects fluid communication between the first pressure-receiving chamber 60 and the equilibrium chamber 64, and permits the fluid to flow between these two chambers 60, 64 therethrough. On the other hand, the second orifice passage 68 effects fluid communication between the second pressure-receiving chamber 62 and the equilibrium chamber 64, and permits the fluid to flow between these two chambers 62, 64 therethrough.

The first orifice passage 66 is dimensioned or tuned such that the ratio of the transverse cross sectional area to the length is smaller than that of the second orifice passage 68. More specifically, the first orifice passage 66 is tuned so that the engine mount exhibits a high damping effect based on the resonance of the fluid flowing through the passage 66, with respect to low-frequency vibrations such as engine shake and bounce, whose frequencies are in the neighborhood of 10 Hz. On the other hand, the second orifice passage 68 is tuned so that the engine mount exhibits a sufficiently low dynamic spring constant based on the resonance of the fluid flowing through the passage 68, with respect to medium-frequency vibrations such as engine idling vibration, whose frequencies fall within a range of 20-50 Hz.

When a vibrational load is applied between the inner and outer sleeves 10, 12 of the thus constructed engine mount, a periodic change in the fluid pressure occurs in the first pressure-receiving chamber 60, causing a pressure difference between the first pressure-receiving and equilibrium chambers 60, 64, whereby the fluid is forced to flow between these chambers 60, 64 through the first orifice passage 66. Further, the pressure change in the first pressure-receiving chamber 60 is more or less transmitted to the second pressure-receiving chamber 62 by means of the periodic elastic oscillatory displacement of the flexible layer 52, whereby a similar pressure difference occurs between the second pressure-receiving chamber 62 and the equilibrium chamber 64, causing the fluid to flow through the second orifice passage 68.

Where the frequency of the input vibration is lower than the tuned resonance frequency of the first orifice passage 66, the pressure change in the first pressure-receiving chamber 60 is not completely accommodated by the elastic displacement of the flexible layer 52, but the pressure change causes the fluid to flow through the first orifice passage 66, since the fluid flow resistance of the first orifice passage 66 is relatively low. Consequently, the relatively low-frequency vibrations such as engine shake can be effectively damped based on the resonance of the fluid flowing through the first orifice passage 66.

Where the frequency of the input vibration is higher than the tuned resonance frequency of the first orifice passage 66, the fluid flow resistance of the passage 66 is considerably increased, and the passage 66 operates as if it was substantially closed. Consequently, the pressure change caused in the first pressure-receiving chamber 60 is transmitted to the second pressure-receiving chamber 62 through the oscillating flexible layer 52, causing the fluid to flow through the second orifice passage 68. Therefore, the present arrangement is effective to minimize an increase in the dynamic spring constant of the engine mount which would otherwise occur due to substantial closure of the first orifice passage 66 upon application of a medium- or high-frequency vibration. Namely, the present engine mount is capable of exhibiting an effectively lowered dynamic spring constant based on the resonance of the fluid flowing through the second orifice passage 68, with respect to medium-frequency vibrations such as engine idling vibration.

It will be understood from the above description that the present engine mount exhibits not only a high damping effect with respect to low-frequency vibrations such as engine shake and bounce, but also a sufficiently low dynamic spring constant with respect to medium-frequency vibrations such as engine idling vibration. These two different operating characteristics are both derived from the resonance of the fluid. Thus, the present engine mount provides improved vibration damping or isolating characteristics over a wide range of frequency of the input vibrations, thereby assuring significantly improved driving comfort.

It is also noted that the first and second orifice passages 66, 68 are automatically selectively brought into their operative state, depending upon the frequency of the received vibration, without having to use any actuator for controlling the passages 66, 68. Accordingly, the present engine mount having the excellent damping or isolating characteristics derived from the passages 66, 68 can be available at a relatively low cost with a relatively simple construction. In this respect, the instant fluid-filled engine mount has an industrial significance.

Further, the instant engine mount is capable of exhibiting a low dynamic spring constant with respect to even high-frequency vibrations such as beats or engine-transmitted noises whose vibrations are higher than the tuned resonance frequency of the second orifice passage 68. That is, this excellent characteristic with respect to the high-frequency vibrations can be obtained by suitably tuning the dimensions and configuration of the restricted portion 63 formed around the resonance portion of the resonance member 24 within the first pressure-receiving chamber 60, so that the high-frequency vibrations are effectively isolated based on the resonance of the fluid flowing through the resonance portion 63.

Modified embodiments of the vehicle engine mount of the present invention will be described, by reference to FIGS. 8-12, in which the same reference numerals as used in FIGS. 1-7 will be used to identify the functionally corresponding components. No redundant description of these components will be provided.

Figure 8:
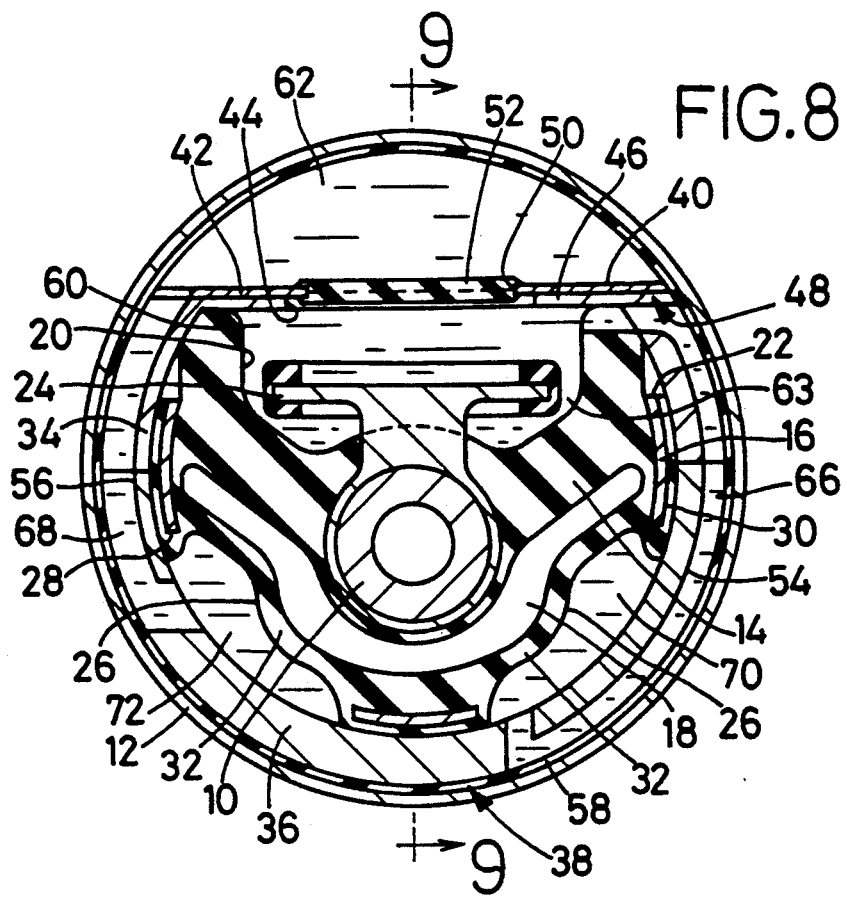
FIG. 8 is a transverse cross sectional view of another embodiment of the engine mount of the present invention.
Figure 9:
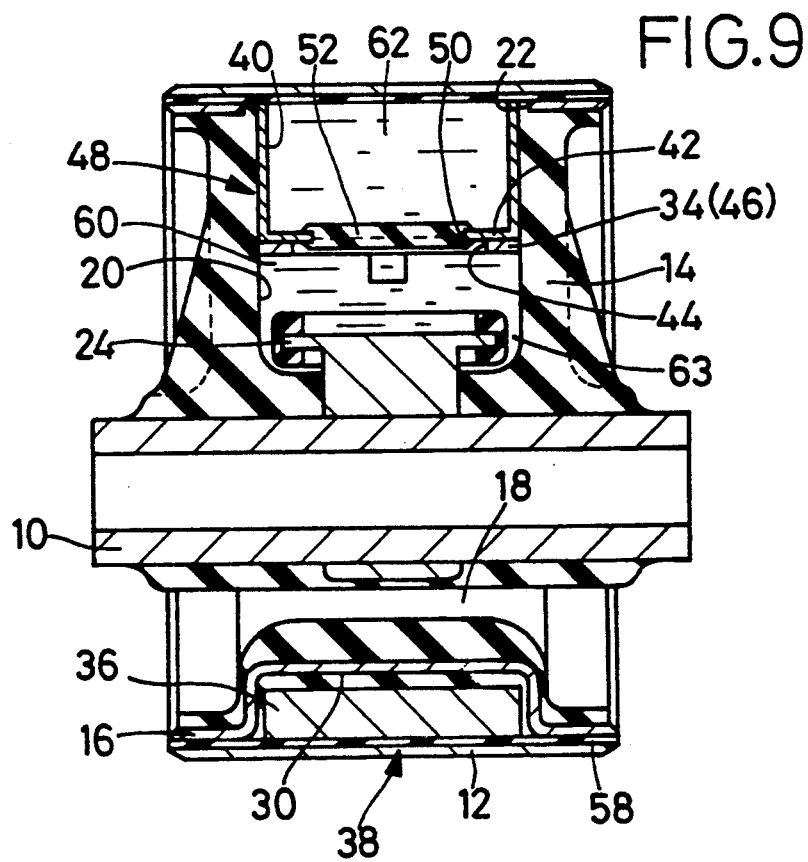
FIG. 9 is a cross sectional view taken along line 9—9 of FIG. 8.

Referring to FIGS. 8 and 9 illustrating the second embodiment of the invention, the equilibrium chamber 64 provided in the first embodiment is replaced by two mutually independent equilibrium chambers 70, 72. The first equilibrium chamber 70 communicates with the first pressure-receiving chamber 60 through the first orifice passage 66, while the second equilibrium chamber 72 communicates with the second pressure-receiving chamber 62 through the second orifice passage 68.

While the first orifice passage 66 in this second embodiment has a smaller length than that in the first embodiment, the transverse cross sectional area is accordingly reduced so that the ratio of the transverse cross sectional area to the length is substantially equal to that in the first embodiment. Hence, the first orifice passage 66 of the instant embodiment provides a similar damping effect with respect to the engine shakes and other low-frequency vibrations, based on the resonance of the fluid flowing therethrough.

Like the engine mount of the first embodiment, the engine mount according to the second embodiment exhibits excellent damping or isolating characteristics based on the resonance of the fluid masses flowing through the first and second orifice passages 66, 68, with respect to the vibrations having frequencies to which the passages 66, 68 are tuned. That is, the low-frequency vibrations such as the shakes can be effectively isolated or damped based on the resonance of the fluid flowing through the first orifice passage 66, while the medium-frequency vibrations such as the idling vibrations can be effectively damped or isolated based on the resonance of the fluid flowing through the second orifice passage 68.

Figure 10:
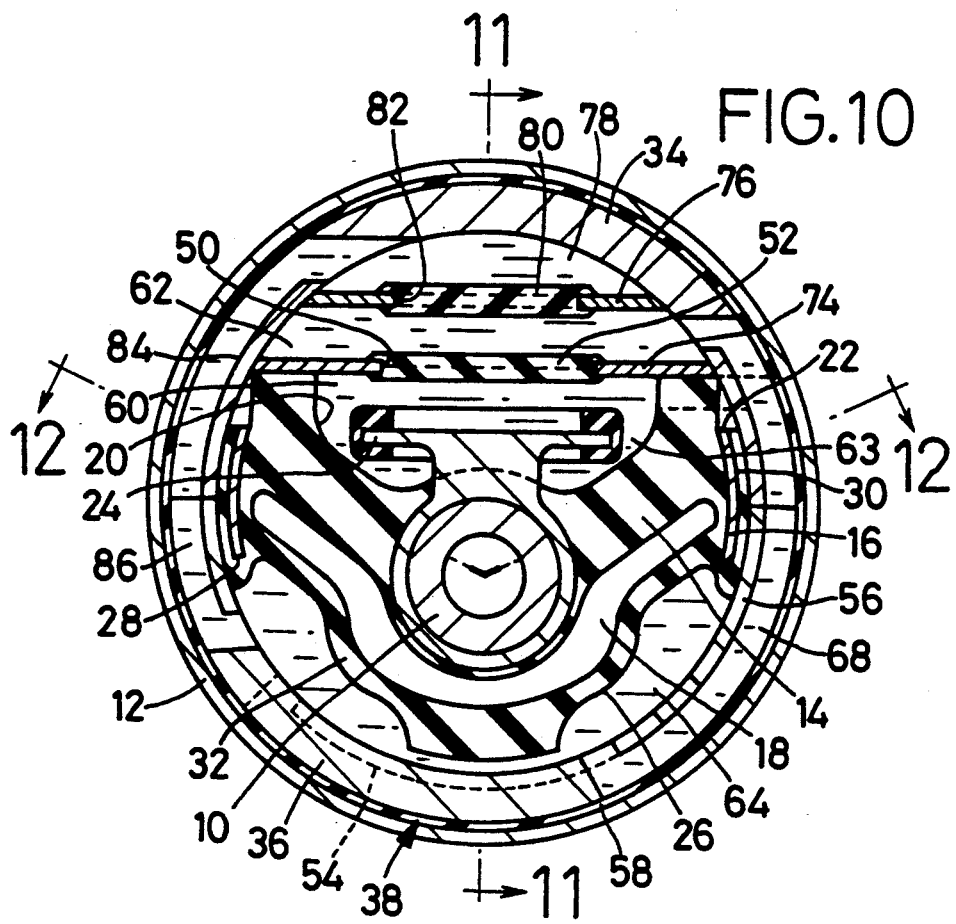
FIG. 10 is a transverse cross sectional view of a further embodiment of the invention.
Figure 11:
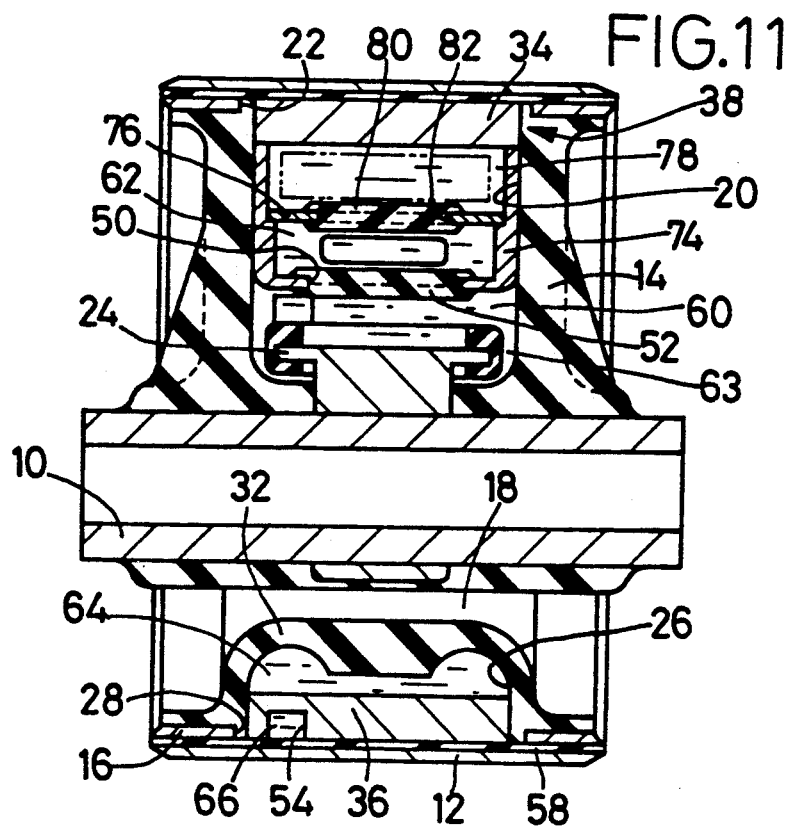
FIG. 11 is a cross sectional view taken along line 11—11 of FIG. 10.
Figure 12:
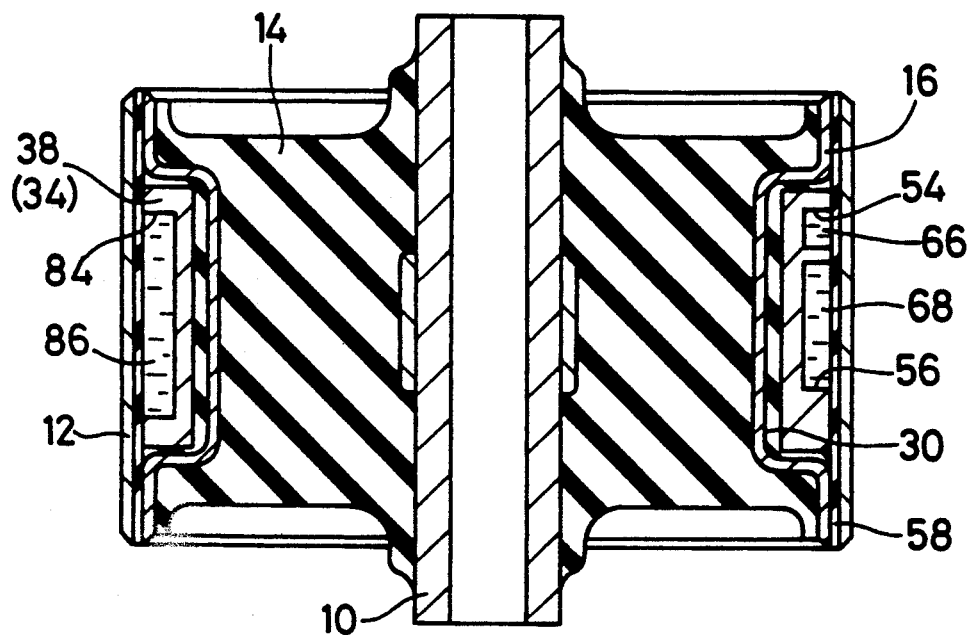
FIG. 12 is a cross sectional view taken along line 12—12 of FIG. 10.

Referring next to FIGS. 10-12, the third embodiment of the present invention will be described.

In the present modified embodiment, a U-shaped channel member 74 is disposed within the closed first pocket 20, while being supported by the orifice-defining sleeve 38, which does not have the flat wall 46 as provided in the first and second embodiments. The channel member 74 separates the first pressure-receiving chamber 60 from the rest of the closed pocket 20. The channel member 74 has the flexible layer 52 closing the window 50 formed in the bottom wall. A partition plate 76 is fixed to the channel member 74 so as to divide the inside of the channel member 74 (above-indicated rest of the closed pocket 20) into two second pressure-receiving chambers 62, 78 which are spaced from each other in the radial direction of the sleeves 10, 12.

The partition plate 76 has a window 82 formed in a central portion thereof, and the window 82 is closed by a flexible layer 80, so that a pressure change in the lower second pressure-receiving chamber 62 is transmitted to the upper second pressure-receiving chamber 78 by means of elastic displacement of the flexible layer 80. In the present arrangement wherein the upper second pressure-receiving chamber 78 is disposed in series with the lower second pressure-receiving chamber 62 and the first pressure-receiving chamber 60, so that the pressure change in the first pressure-receiving chamber 60 may be eventually transmitted to the upper second pressure-receiving chamber 78, through the flexible layer 52 provided on a first partition member in the form of the channel member 74, and the flexible layer 80 provided on a second partition member in the form of the partition plate 76.

In the third embodiments of FIGS. 10-12, the flexible layer 80 closing the window 82 in the partition plate 76 is not reinforced by a canvas or other reinforcing material, and has a higher degree of rigidity than the flexible layer 52 closing the window 50 in the U-shaped channel member 74.

The orifice-defining sleeve 38 used in the third embodiment has a third U-groove 84 in addition to the first and second U-grooves 54, 56 providing the first and second orifice passages 66, 68. The third U-groove 84 is also closed by the outer sleeve 12, to provide an orifice passage 86 for fluid communication between the equilibrium chamber 64 and the upper second pressure-receiving chamber 78. That is, the two second orifice passages 68, 86 are provided for fluid communication of the equilibrium chamber 64 with the pair of second pressure-receiving chambers 62, 78, respectively.

In the third embodiment, too, the first orifice passage 66 for communication between the equilibrium chamber 64 with the first pressure-receiving chamber 60 is tuned so as to provide a high damping effect based on the resonance of the fluid flowing through the passage 66, with respect to the shakes, bounces and other low-frequency vibrations. The ratio of the transverse cross sectional area to the length of the radially inner second orifice passage 68 is determined to be larger than that of the first orifice passage 66, so that the dynamic spring constant of the engine mount based on the resonance of the fluid flowing through the passage 68 is sufficiently lowered so as to effectively isolate the idling vibration and other medium-frequency vibrations. On the other hand, the radially outer second orifice passage 86 is tuned such that the above-indicated ratio of the passage 86 is larger than that of the radially inner second pressure-receiving passage 68, so that the resonance of the fluid flowing through the radially outer second orifice passage 86 is effective to provide a low dynamic spring constant with respect to booming noises and other high-frequency vibrations. It will be therefore understood that the radially inner second orifice passage 68 has a lower fluid flow resistance than the first orifice passage 66, and the other or radially outer second orifice passage 86 has a lower fluid flow resistance than the second orifice passage 68.

In the present modified engine mount of FIGS. 10-12, the fluid is forced to flow through the first orifice passage 66 when the frequency of the input vibration is lower than the tuned resonance frequency of the passage 66. When the frequency of the input vibration is higher than the tuned resonance frequency of the first orifice passage 66 and lower than that of the second orifice passage 68, the fluid is forced to flow through the radially inner second orifice passage 68. Further, the fluid is forced to flow through the other second orifice passage 86, when the frequency of the input vibration is higher than the tuned resonance frequence of the passage 68.

Thus, the present engine mount effectively damps or isolates the three different ranges of input vibrations to which the three orifice passages 66, 68, 86 are tuned, based on the resonance effects of the fluid flowing through the three orifice passages 66, 68, 86 which are selectively brought into their operative state depending upon the specific frequency of the received vibration. The engine shakes and other low-frequency vibrations can be effectively isolated by means of the resonance of the fluid flowing through the radially inner orifice passage 66, while the idling vibration and other medium-frequency vibrations can be effectively isolated by means of the resonance of the fluid flowing through the first second orifice passage 68. Further, the booming noises and other high-frequency vibrations can be effectively isolated by means of the resonance of the radially outer second orifice passage 86.

In particular, it is noted that the flexible layer 80 disposed between the two second pressure-receiving chambers 62, 78 has a higher value of rigidity than the flexible layer 52 disposed between the first pressure-receiving chamber 60 and the radially inner second pressure-receiving chamber 62. Consequently, the periodic pressure change in the radially inner second pressure-receiving chamber 62 upon application of the idling vibration is not easily absorbed by the oscillatory displacement of the flexible layer 80, whereby the fluid is likely to be forced to flow through the second orifice passage 68, to effectively isolate the idling vibration.

Although the present invention has been described in its presently preferred embodiments with a certain degree of particularity, it is to be understood that the invention is not limited to the details of the illustrated embodiments, but may be otherwise embodied.

For example, the orifice passages for fluid communication of the first and second pressure-receiving chambers with the equilibrium chamber may be suitably modified, depending upon the configuration and required vibration damping or isolating characteristics of the particular engine mount.

The resonance member 24 whose resonance portion is positioned within the first pressure-receiving chamber 60 to provide the restricted portion 63 is not essential to practice the principle of the present invention.

In the third embodiment, the flexible layer 80 partially defining the radially outer second pressure-receiving chamber 78 has a higher rigidity value than the flexible layer 52 partially defining the radially inner second pressure-receiving chamber 62. However, this is not an essential requirement of the present invention, either.

The partition member or members separating the first and second pressure-receiving chambers (60, 62, 78) may be suitably modified.

While the third embodiment uses a pair of second pressure-receiving chambers (62, 78) and a pair of second orifice passages (68, 86), the engine mount may be modified to use three or more pressure-receiving chambers and three or more orifice passages.

Although the illustrated embodiments of the invention are all adapted to be used as a vehicle engine mount, the principle of the invention is equally applicable to a differential mount or member mount for motor vehicles, and even to a cylindrical elastic mount used for devices or equipment other than motor vehicles.

It is to be understood that the invention may be embodied with various other changes, modifications and improvements, which may occur to those skilled in the art, without departing from the spirit and scope of the invention defined in the following claims.

What is claimed is:

1. A fluid-filled elastic mount for flexibly connecting two members, comprising:

an inner and an outer sleeve which are radially spaced apart from each other and which are fixed to said two members;

an elastic body interposed between said inner and outer sleeves, for elastically connecting the inner and outer sleeves;

said elastic body at least partially defining a first pressure-receiving chamber which is filled with a non-compressible fluid and which is disposed between said inner and outer sleeves such that a pressure in said fluid in said first pressure-receiving chamber changes due to elastic deformation of said elastic body upon application of a vibrational load between said inner and outer sleeves;

partition means for partially defining a second pressure-receiving chamber between said inner and outer sleeves and separating said first and second pressure-receiving chambers from each other such that said second pressure-receiving chamber is disposed outwardly of said first pressure-receiving chamber in a radial direction of said inner and outer sleeves, said second pressure-receiving chamber being filled with said fluid;

said partition means including a flexible layer which is displaceable to thereby permit a pressure change in said first pressure-receiving chamber to be transmitted to said second pressure-receiving chamber;

a flexible diaphragm partially defining two separate sections of a variable-volume equilibrium chamber between said inner and outer sleeves, said equilibrium chamber being spaced apart from said first and second pressure-receiving chambers in a circumferential direction of said inner and outer sleeves and filled with said non-compressible fluid;

means for defining a first orifice passage for fluid communication between said first pressure-receiving chamber and one of said two separate sections of said equilibrium chamber; and means for defining a second orifice passage for fluid communication between said second pressure-receiving chamber and the other of said two separate sections of said equilibrium chamber, a ratio of a transverse cross sectional area to a length of said second orifice passage being larger than that of said first orifice passage.

2. A fluid-filled elastic mount for flexibly connecting two members, comprising:

an inner and an outer sleeve which are radially spaced apart from each other and which are fixed to said two members;

an elastic body interposed between said inner and outer sleeves, for elastically connecting the inner and outer sleeves;

said elastic body at least partially defining a first pressure-receiving chamber which is filled with a non-compressible fluid and which is disposed between said inner and outer sleeves such that a pressure in said fluid in said first pressure-receiving chamber changes due to elastic deformation of said elastic body upon application of a vibrational load between said inner and outer sleeves;

partition means for partially defining a plurality of second pressure-receiving chambers between said inner and outer sleeves and separating said first and second pressure-receiving chambers from each other, each of said plurality of second pressure-receiving chambers being filled with said non-compressible fluid;

said partition means including a first flexible layer which is displaceable to thereby permit a pressure change in said first pressure-receiving chamber to be transmitted to said plurality of second pressure-receiving chambers, said partition means further including at least one second flexible layer for at least partially defining said plurality of second pressure-receiving chambers such that said plurality of second pressure-receiving chambers are spaced from each other in a radial direction of said inner and outer sleeves, said at least one second flexible layer being displaceable to permit said pressure change in said first pressure-receiving chamber to be successively transmitted to said plurality of second pressure-receiving chambers;

a flexible diaphragm partially defining a variable-volume equilibrium chamber between said inner and outer sleeves, said equilibrium chamber being spaced apart from said first and second pressure-receiving chambers in a circumferential direction of said inner and outer sleeves and filled with said non-compressible fluid;

means for defining a first orifice passage for fluid communication between said first pressure-receiving chamber and said equilibrium chamber; and means for defining a plurality of second orifice passages for fluid communication of said equilibrium chamber with said plurality of second pressure-receiving chambers, respectively, ratios of a transverse cross sectional area to a length of said plurality of second orifice passages being larger than that of said first orifice passage, said ratios of said second orifice passages increasing with a radial distance of the corresponding second pressure-receiving chambers from said first pressure-receiving chamber.

3. A fluid-filled elastic mount according to claim 2, wherein said plurality of second pressure-receiving chambers consist of a radially inner second pressure-receiving chamber which is separated from said first pressure-receiving chamber by a first partition member including said first flexible layer and a radially outer second pressure-receiving chamber which is separated from said radially inner second pressure-receiving chamber by a second partition member including the second flexible layer.

4. A fluid-filled elastic mount for flexibly connecting two members, comprising:

an inner and an outer sleeve which are radially spaced apart from each other and which are fixed to said two members;

an elastic body interposed between said inner and outer sleeves, for elastically connecting the inner and outer sleeves;

said elastic body at least partially defining a first pressure-receiving chamber which is filled with a non-compressible fluid and which is disposed between said inner and outer sleeves such that a pressure in said fluid in said first pressure-receiving chamber changes due to elastic deformation of said elastic body upon application of a vibrational load between said inner and outer sleeves;

partition means for partially defining at least one second pressure-receiving chamber between said inner and outer sleeves and separating said first and second pressure-receiving chambers from each other, each of said at least one second pressure-receiving chamber being disposed outwardly of said first pressure-receiving chamber in a radial direction of said inner and outer sleeves, and filled with said fluid;

said partition means including a flexible layer which is displaceable to thereby permit a pressure change in said first pressure-receiving chamber to be transmitted to said at least one second pressure-receiving chamber;

a flexible diaphragm partially defining a variable-volume equilibrium chamber between said inner and outer sleeves, said equilibrium chamber being spaced apart from said first and second pressure-receiving chambers in a circumferential direction of said inner and outer sleeves and filled with said non-compressible fluid;

means for defining a first orifice passage for fluid communication between said first pressure-receiving chamber and said equilibrium chamber; and means for defining a second orifice passage for fluid communication between said each second pressure-receiving chamber and said equilibrium chamber, a ratio of a transverse cross sectional area to a length of said each second orifice passage being larger than that of said first orifice passage.

5. A fluid-filled elastic mount according to claim 4, further comprising a resonance member which has a resonance portion disposed within said first pressure-receiving chamber such that a restricted portion is defined between a periphery of said resonance portion and an inner surface of said elastic body which defines said first pressure-receiving chamber.

6. A fluid-filled elastic mount according to claim 4, wherein said means for defining a first orifice passage and said means for defining a second orifice passage comprise an orifice-defining sleeve having a first and a second groove formed in an outer circumferential surface thereof, said first and second grooves communicating with said equilibrium chamber, and with said first pressure-receiving chamber and said at least one second pressure-receiving chamber, respectively, said first and second grooves being closed by an inner surface of said outer sleeve to thereby provide said first and second orifice passages.

7. A fluid-filled elastic mount according to claim 6, further comprising an intermediate sleeve disposed between said elastic body and said outer sleeve, said intermediate sleeve having a circumferential groove which accommodates said orifice-defining sleeve such that said first and second grooves are closed by said outer sleeve.

8. A fluid-filled elastic mount according to claim 6, wherein said orifice-defining sleeve consists of two generally semi-cylindrical orifice-defining members.

9. A fluid-filled elastic mount according to claim 4, wherein said at least one second pressure-receiving chamber consists of a single second pressure-receiving chamber, said ratio of said first orifice passage being determined so as to permit the elastic mount to exhibit a high damping effect based on resonance of the fluid flowing through said first orifice passage, with respect to vibrations having frequencies in the neighborhood of 10 Hz, while said ratio of said second orifice passage being determined so as to permit the elastic mount to exhibit a dynamic spring constant which is sufficiently low for effectively isolate vibrations having frequencies within a range of about 20-50 Hz, based on resonance of said fluid flowing through said second orifice passage.

10. A fluid-filled elastic mount according to claim 4, wherein said partition means includes a flat wall having a window which is closed by said flexible layer.

* * * * *